United States Patent
Kneckt et al.

(10) Patent No.: US 10,524,286 B2
(45) Date of Patent: Dec. 31, 2019

(54) POWER SAVING USING INTEGRATED CF-END INDICATION

(71) Applicant: Apple Inc., Cupertino, CA (US)

(72) Inventors: Jarkko L. Kneckt, Los Gatos, CA (US); Ashok Ranganath, San Jose, CA (US); Yong Liu, Campbell, CA (US); Christiaan A. Hartman, San Jose, CA (US); Guoqing Li, Campbell, CA (US); Oren Shani, Saratoga, CA (US); Joonsuk Kim, Saratoga, CA (US)

(73) Assignee: Apple Inc., Cupertino, CA (US)

(*) Notice: Subject to any disclaimer, the term of this patent is extended or adjusted under 35 U.S.C. 154(b) by 2 days.

(21) Appl. No.: 15/605,158

(22) Filed: May 25, 2017

(65) Prior Publication Data

US 2017/0347370 A1 Nov. 30, 2017

Related U.S. Application Data

(60) Provisional application No. 62/341,289, filed on May 25, 2016.

(51) Int. Cl.
*H04W 74/00* (2009.01)
*H04W 74/08* (2009.01)
(Continued)

(52) U.S. Cl.
CPC .......... *H04W 74/006* (2013.01); *H04W 84/12* (2013.01)

(58) Field of Classification Search
CPC .... H04W 74/006; H04W 84/12; Y02D 70/20; Y02D 70/14; Y02D 70/26; Y02D 70/22;
(Continued)

(56) References Cited

U.S. PATENT DOCUMENTS

| 7,310,679 B1* | 12/2007 | Doyle | H04L 29/06027 |
| | | | 709/231 |
| 2015/0049680 A1* | 2/2015 | Jeffery | H04W 74/0816 |
| | | | 370/329 |

(Continued)

OTHER PUBLICATIONS

Perez-Costa et al., "IEEE 802.11E QoS and Power Saving Features Overview and Analysis of Combined Performance," IEEE Wireless Communications, Aug. 2010, pp. 88-96.
(Continued)

*Primary Examiner* — Kiet Tang
(74) *Attorney, Agent, or Firm* — Dickinson Wright RLLP

(57) ABSTRACT

An electronic device that transmits a frame to a second electronic device is described. In particular, during operation, an interface circuit in the electronic device (such as an access point in a WLAN) may transmit the frame to the second electronic device using a Wi-Fi communication protocol. The frame may include information cancelling a previously specified NAV protected time in a preamble of the frame. For example, the information may include a CF-End indication. Moreover, the information may be included in a MAC header of the frame and, more generally, in a preamble of a high efficiency (HE) physical layer convergence protocol (PLCP) protocol data unit (PPDU). Furthermore, the electronic device may transmit the frame in response to a block acknowledgment (BA) from the second electronic device.

20 Claims, 19 Drawing Sheets

(51) Int. Cl.
*H04L 29/06* (2006.01)
*H04W 52/02* (2009.01)
*H04W 84/12* (2009.01)

(58) Field of Classification Search
CPC ............. Y02D 70/1264; Y02D 70/144; Y02D 70/142; Y02D 70/1242; Y02D 70/166; Y02D 70/1262
See application file for complete search history.

(56) References Cited

U.S. PATENT DOCUMENTS

| | | | | |
|---|---|---|---|---|
| 2015/0103722 | A1* | 4/2015 | Seok | H04W 52/0216 370/311 |
| 2015/0373702 | A1* | 12/2015 | Merlin | H04W 72/0446 370/329 |
| 2017/0064739 | A1* | 3/2017 | Hedayat | H04W 74/0816 |

OTHER PUBLICATIONS

Huang et al., "Consideration of TXOP Duration Field," DensiFi, Mar. 8, 2016, 15 pages.
Zhang et al., "Bits of TXOP duration in HE-SIGA," DensiFi, Jan. 13, 2016, 18 pages.

* cited by examiner

POWER SAVING USING INTEGRATED CF-END INDICATION

CROSS-REFERENCE TO RELATED APPLICATIONS

This Application claims the benefit of U.S. Provisional Patent Application No. 62/341,289, entitled "POWER SAVING USING INTEGRATED CF-END INDICATION" filed May 25, 2016, the content of which is incorporated herein by reference in its entirety for all purposes.

FIELD

The described embodiments relate, generally, to wireless communications among electronic devices in a wireless local area network (WLAN), including electronic devices and techniques for efficiently communicating contention free (CF)-End and, more generally, cancelling a protected time associated with a network allocation vector (NAV).

BACKGROUND

Many electronic devices communicate with each other using wireless local area networks (WLANs), such as those based on a communication protocol that is compatible with an IEEE 802.11 standard (which is sometimes referred to as 'Wi-Fi'). For example, during Wi-Fi communication, electronic devices access a shared channel using a contention-based channel-access technique.

In order to reduce power consumption while determining channel availability by listening for transmissions on the shared channel, Wi-Fi includes a virtual carrier-sensing technique. In particular, the medium access control (MAC) layer frame header transmitted by a first electronic device usually contains a duration field (which is referred to as a NAV) that specifies a transmission-time duration required for the frame. During the transmission-time duration specified by the NAV the shared channel is expected to be busy. Using the NAV, another electronic device in a WLAN may set a count-down value in a counter. The other electronic device may use the value in the counter as an indication for how long it should defer from accessing the shared channel and, thus, how long it does not need to listening for transmissions on the shared channel.

However, the virtual carrier sensing provided by the NAV is typically coarse and involves the electronic devices estimating the transmission-time duration. There are often changes in data traffic and/or the transmission-time duration may be less than the amount of time specified by the NAV. When this occurs, an electronic device in the WLAN may transmit an additional CF-End frame to alert other electronic devices in the WLAN that the shared channel is no longer busy (i.e., to free up the remaining time previously specified by the NAV). In response, the other electronic devices in the WLAN may also transmit a CF-End frame. These transmissions constitute additional overhead in the WLAN and can increase the power consumption of the electronic devices, which can reduce their battery life.

SUMMARY

Some embodiments that relate to an electronic device that transmits a frame to a second electronic device are described. In particular, during operation, an interface circuit in the electronic device (such as an access point in a WLAN) may transmit the frame to the second electronic device using a Wi-Fi communication protocol. The frame may include information cancelling a previously specified NAV protected time in a preamble of the frame.

For example, the information may include a CF-End indication. Moreover, the information may be included in a MAC header of the frame, such as in a high-efficiency (HE) SIG-A field. In particular, the information may be included in a transmit opportunity (TXOP) field in the HE SIG-A field. More generally, the information may be included in the preamble of a HE physical layer convergence protocol (PLCP) protocol data unit (PPDU).

In some embodiments, the electronic device receives a block acknowledgment (BA) from the second electronic device. In response to the BA, the electronic device may transmit the frame.

Note that the Wi-Fi communication protocol may be compatible with an IEEE 801.11 ax standard.

Furthermore, the electronic device includes additional information in a second frame to indicate a reverse direction grant (RDG) TXOP that releases previously specified NAV protected time and enables the electronic device to transmit data during a TXOP of the second electronic device. In some embodiments, the electronic device performs this operation separately from the aforementioned operations and/or the following operations.

Additionally, the electronic device may determine that the second electronic device is a legacy electronic device that does not support including the information in the frame. Based on the determination, the second electronic device transmits a CF-End frame to the second electronic device instead of or in addition to the frame.

Other embodiments include operation with and/or by the second electronic device.

Other embodiments provide an interface circuit in the electronic device or the second electronic device.

Other embodiments provide a computer-program product for use with the interface circuit in the electronic device or the second electronic device. This computer-program product includes instructions for at least some of the aforementioned operations performed by the interface circuit in the electronic device or the second electronic device.

Other embodiments provide a method for communicating information cancelling a previously specified NAV protected time. The method includes at least some of the aforementioned operations performed by the interface circuit in the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
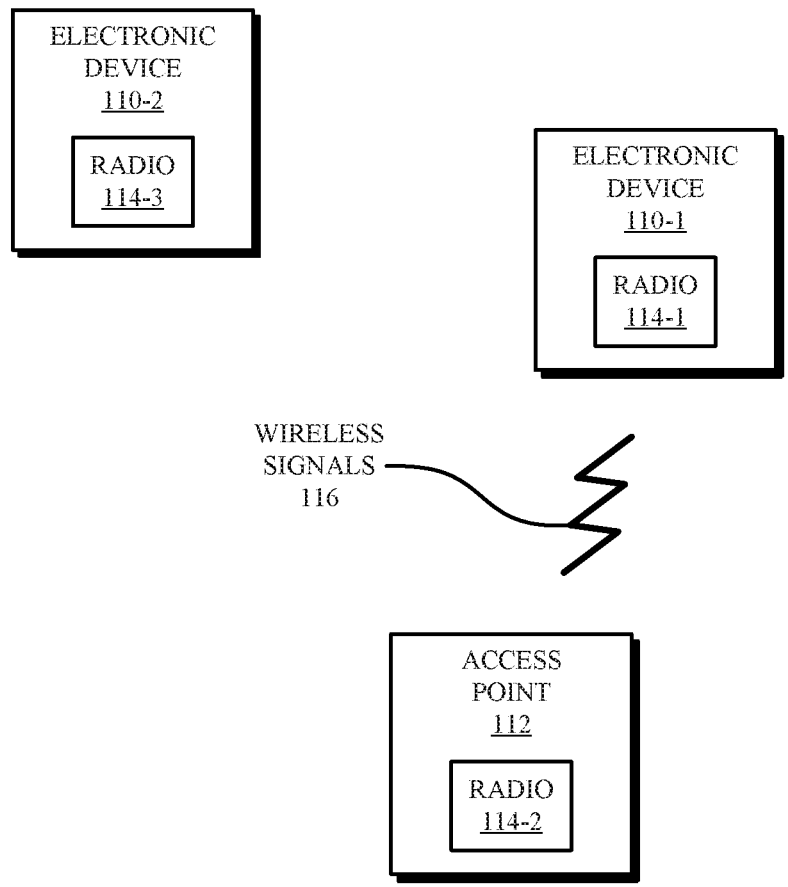
FIG. 1 is a block diagram illustrating an example of electronic devices communicating wirelessly.

Table 1 provides an example of information that specifies a reverse direction grant (RDG).

Table 2 provides an example of information in a high throughput (HT) control field.

Table 3 provides an example of information included in a media access control (MAC) header.

Note that like reference numerals refer to corresponding parts throughout the drawings. Moreover, multiple instances of the same part are designated by a common prefix separated from an instance number by a dash.

DETAILED DESCRIPTION

An electronic device that transmits a frame to a second electronic device is described. In particular, during operation, an interface circuit in the electronic device (such as an access point in a WLAN) may transmit the frame to the second electronic device using a Wi-Fi communication protocol. The frame may include information cancelling a previously specified NAV protected time in a preamble of the frame. For example, the information may include a CF-End indication. Moreover, the information may be included in a MAC header of the frame and, more generally, in a preamble of a HE PPDU. Furthermore, the electronic device may transmit the frame in response to a block acknowledgment (BA) from the second electronic device. In some embodiments, the electronic device includes additional information in a second frame to indicate an RDG TXOP that releases previously specified NAV protected time and enables the electronic device to transmit data during a TXOP of the second electronic device.

By including the information in the frame, this communication technique may reduce overhead in the WLAN and may reduce power consumption of the electronic device and the second electronic device. Therefore, the communication technique may improve the communication performance in the WLAN and may increase the battery life of the electronic device and the second electronic device. Consequently, the communication technique may improve the user experience when using the electronic device or the second electronic device, and thus may increase customer satisfaction and retention.

Note that the communication technique may be used during wireless communication between electronic devices in accordance with a communication protocol, such as: an Institute of Electrical and Electronics Engineers (IEEE) 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram illustrating an example of electronic devices communicating wirelessly. In particular, one or more electronic devices 110 (such as a smartphone, a laptop computer, a notebook computer, a tablet, or another such electronic device, which is sometimes referred to as a 'primary electronic device') and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual access point that is implemented on a computer.

As described further below with reference to FIG. 19, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. For example, access point 112 may transmit a packet to electronic device 110-1 that includes a NAV. This NAV may specify a protected time (which is sometimes referred to as a 'NAV protected time') during which the shared channel in the WLAN is being used by or is reserved by access point 112.

Subsequently, when access point 112 has completed transmitted data to electronic device 110-1, access point 112 may transmit a frame to electronic device 110-1 that includes information cancelling a previously specified NAV protected time in a preamble of the frame. For example, the information may include a CF-End indication. Moreover, the information may be included in a MAC header of the frame, such as in a HE SIG-A field. In particular, the information may be included in a TXOP field in the HE SIG-A field. More generally, the information may be included in the preamble of a HE PPDU.

In some embodiments, electronic device 110-1 first transmits a BA to access point 112. Then, in response to the BA, access point 112 may transmit the frame.

Additionally, access point 112 may determine that electronic device 110-1 is a legacy electronic device that does not support including the information in the frame. Based on the determination, access point 112 transmits a CF-End frame to electronic device 110-1. Note that the CF-End frame may be transmitted instead of or in addition to the frame.

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

In particular, electronic device 110-1 may transmit a frame with a NAV to access point 112. Subsequently, electronic device 110-1 may transmit data to access point 112. As part of an RDG TXOP, access point 112 may transmit a second frame with additional information (such as continuation information) that specifies an RDG TXOP to release the NAV protected time, so that access point 112 can transmit data during a TXOP of electronic device 110-1.

In these ways, the communication technique may allow electronic devices 110 and access point 112 to reduce overhead in the WLAN and to reduce their power consumption. These capabilities may improve the user experience when using electronic devices 110.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
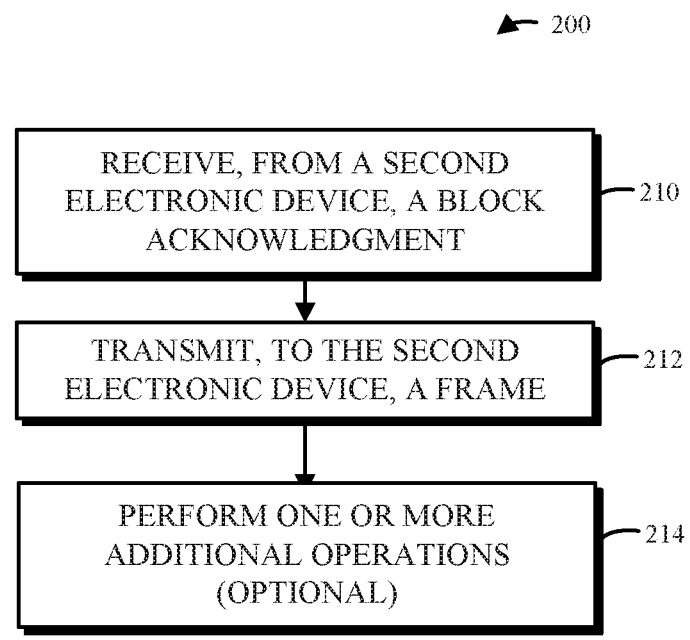
FIG. 2 is a flow diagram illustrating an example of a method for communicating information cancelling a previously specified network allocation vector (NAV) protected time using one of the electronic devices in FIG. 1.

FIG. 2 presents a flow diagram illustrating an example method 200 for communicating information cancelling a previously specified NAV protected time in accordance with some embodiments. This method may be performed by an electronic device, such as an interface circuit in one of electronic devices 110 or 112 in FIG. 1. During operation, the electronic device transmits a frame (operation 212) to the second electronic device using a Wi-Fi communication protocol. The frame may include information cancelling a previously specified NAV protected time in a preamble of the frame.

For example, the information may include a CF-End indication. Moreover, the information may be included in a MAC header of the frame, such as in a HE SIG-A field. In particular, the information may be included in a TXOP field in the HE SIG-A field. More generally, the information may be included in the preamble of a HE PPDU.

Moreover, the electronic device may optionally receive a BA (operation 210) from the second electronic device. In response to the BA, the electronic device may transmit the frame (operation 212).

In some embodiments, the electronic device optionally performs one or more additional operations (operation 214). For example, the electronic device may optionally determine that the second electronic device is a legacy electronic device that does not support including the information in the frame, such as when the second electronic device does not transmit HE PPDUs or only transmits legacy frames (thus, whether or not the second electronic device is a legacy electronic device may be determined based on the types of PPDUs the second electronic device transmits). Based on the determination, the electronic device may transmit a CF-End frame to the second electronic device instead of or in addition to the frame. Furthermore, the electronic device may transmit additional information in a second frame during an RDG TXOP to release the NAV protected time, so that the electronic device can transmit data during a TXOP of the second electronic device.

Figure 3:
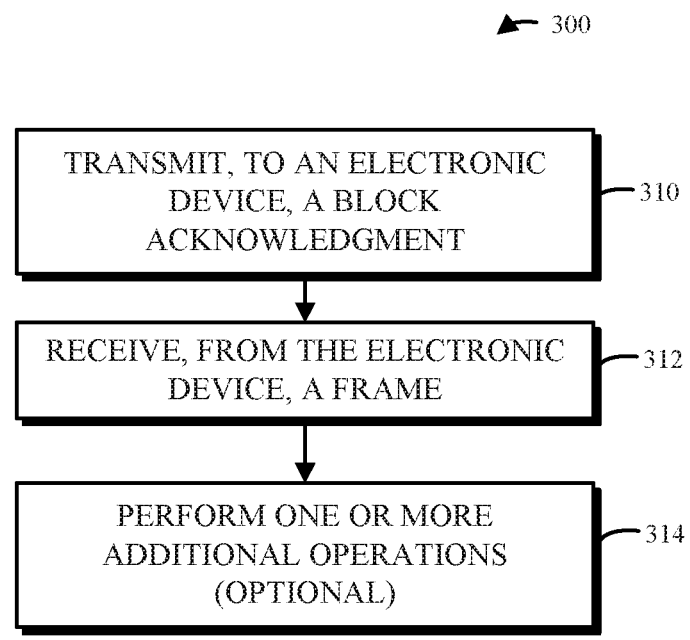
FIG. 3 is a flow diagram illustrating an example of a method for communicating information cancelling a previously specified NAV protected time using one of the electronic devices in FIG. 1.

FIG. 3 presents a flow diagram illustrating an example method 300 for communicating information cancelling a previously specified NAV protected time in accordance with some embodiments. This method may be performed by a second electronic device, such as an interface circuit in one of electronic devices 110 in FIG. 1. During operation, the second electronic device receives a frame (operation 312) from the electronic device using a Wi-Fi communication protocol. The frame may include information cancelling a previously specified NAV protected time in a preamble of the frame.

For example, the information may include a CF-End indication. Moreover, the information may be included in a MAC header of the frame, such as in a HE SIG-A field. In particular, the information may be included in a TXOP field in the HE SIG-A field. More generally, the information may be included in the preamble of a HE PPDU.

Moreover, the second electronic device may optionally transmit a BA (operation 310) to the electronic device. In response to the BA, the second electronic device may receive the frame (operation 312).

In some embodiments, the second electronic device optionally performs one or more additional operations (operation 314). For example, the electronic device may optionally determine that the second electronic device is a legacy electronic device that does not support including the information in the frame, such as when the second electronic device does not transmit HE PPDUs or only transmits legacy frames (thus, whether or not the second electronic device is a legacy electronic device may be determined based on the types of PPDUs the second electronic device transmits). Based on the determination, the second electronic device may receive a CF-End frame from the electronic device instead of or in addition to the frame. Furthermore, the second electronic device may receive additional information in a second frame during an RDG TXOP to release the NAV protected time, so that the electronic device can transmit data during a TXOP of the second electronic device.

In some embodiments of methods 200 (FIG. 2) and/or 300, there may be additional or fewer operations. Moreover, the order of the operations may be changed, and/or two or more operations may be combined into a single operation.

In some embodiments, at least some of the operations in method are performed by interface circuits in the electronic device or the third electronic device. For example, at least some of the operations may be performed by firmware executed by an interface circuit, such as firmware associated with a MAC layer, as well as one or more circuits in a physical layer in the interface circuit.

Figure 4:
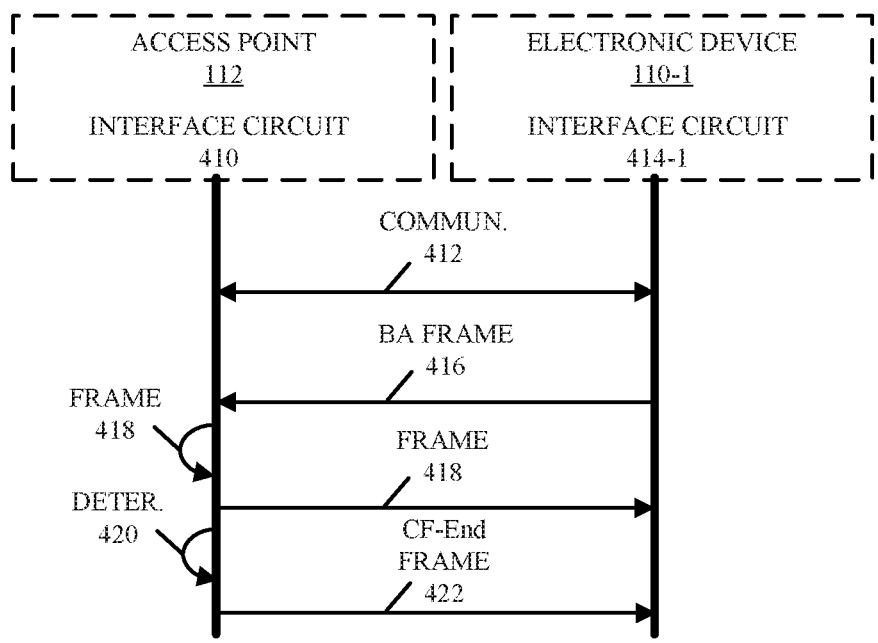
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. In particular, interface circuit 410 in access point 112 may communicate, as indicated at 412, with interface circuit 414-1 in electronic device 110-1 using Wi-Fi. (While communication 412 is illustrated as bilateral in FIG. 4, in other embodiments communication 412 is unilateral.) During this communication, interface circuit 410 may transmit a NAV in a frame that specifies a NAV protected time during which access point 112 transmits one or more frames.

Subsequently, interface circuit 410 may generate and transmit a frame 418 that includes the information cancelling the previously specified NAV protected time in a preamble of frame 418.

Moreover, interface circuit 410 may optionally determine 420 whether electronic device 110-1 is a legacy device that does not support including the information in frame 418. Based on the determination, interface circuit 410 may transmit a CF-End frame 422 to electronic device 110-1 instead of or in addition to frame 418.

In some embodiments, interface circuit 414-1 optionally transmits a BA 416 to access point 112. In response to the BA, interface circuit 410 may transmit frame 418.

Representative Embodiments

We now describe embodiments of the communication technique. In the communication technique, a CF-End indication may be included in the HE-SIG A field in the MAC header of a HE PPDU preamble. By including this information in the preamble, the overhead in the HE frame exchange between HE electronic devices in a WLAN (i.e., electronic devices that are compatible with the communication technique) may be reduced. Moreover, this approach may allow a non-access-point HE electronic device (or station) to return more rapidly to a power-saving operating mode (such as a sleep mode). Alternatively, the access point may send a CF-END frame to allow a non-access-point HE electronic device to transition faster to the power-saving operating mode.

Furthermore, the access point may steal a single-user up-link TXOP to transmit a multi-user transmission. This may reduce delays to obtain a TXOP for multi-user transmissions. In addition, these embodiments may improve access point performance and may offer an alternative to enhanced distributed channel access (EDCA) parameter tuning.

Additionally, RDG may be enhanced by using the CF-End indication in RDG or to forward the TXOP to a reverse-direction (RD) responder. In particular, an access point may signal whether the access point volunteers to continue the TXOP and to transmit to one or more other electronic devices. Thus, the access point may use the CF-END indication in the HE-SIG A field to release the NAV protected time during an RDG exchange.

Typically, in existing Wi-Fi communication protocols the CF-End frame is a control frame. In response to receiving a CF-End frame, an HE electronic device (or a receiver) may reset the NAV. Note that a CF-End frame may be the only frame that allows the receiver to reset its NAV. Moreover, HE PPDUs may have a TXOP field in the HE-SIG A field to set the NAV for compatible HE electronic devices. The HE-SIG A may be transmitted using the most-robust transmission rate to ensure the distribution of the NAV information to the electronic devices in the WLAN. For example, the TXOP field in the HE-SIG A field may include 6 or 7 bits, which may indicate 64 or 128 corresponding values. Currently, the value in the TXOP field usually indicates the duration of the NAV, similar to the duration field in the MAC header. Furthermore, the HE SIG-A field is usually included in both multi-user (MU) and single-user (SU) PPDUs. However, legacy (non-HE) electronic devices may not be able to receive HE PPDUs. Therefore, these legacy electronic devices may not be able to set NAV based on the received HE PPDUs.

In contrast, in the communication technique the NAV duration may be reset and/or set to a shorter value. This may be performed using information conveyed in the physical (PHY) and/or the MAC headers. The PHY headers may require the use of HE PPDUs. Moreover, there may be two alternatives as to how to signal the CF-End indication in the TXOP field of the HE-SIG A. In some embodiments, a reset bit is defined in the TXOP field, and the two highest values may be reserved.

Alternatively, MAC headers may be transmitted over any PPDU type and the CF-End indication can be described or specified in a MAC header. The information in a MAC header may indicate a shortening of the NAV in all PPDU formats. (Thus, in some embodiments the modification to the NAV is binary, such as from 'on' to 'off', while in other embodiments a greyscale value is used.) Note that the MAC header may be used to request that the recipient send a CF-End frame.

The reset field in the TXOP field (such as bit 0 in the TXOP field) may define the type of the NAV update. For example, a value of '1' may indicate that NAV is shortened to a value specified in the duration field in the TXOP field. Alternatively, a value of '0' may indicate that the NAV is updated normally to a value specified in the duration field. In these embodiments, the NAV value may be increased (a reduction of the NAV duration may not be allowed). In addition, bits 1-6 in the TXOP field (i.e., the duration field) may indicate the duration of the NAV. Note that the duration field in the MAC header may have the same value as the duration field in the TXOP field.

Moreover, when the reset bit is set to 1, the NAV value may be set to a value specified in the duration field. This may allow the electronic device to update the NAV more precisely to the duration of the remainder of the TXOP. For example, the BA duration may be set precisely and the electronic device may set the NAV precisely for the BA duration. In this way, the duration of the NAV may be set such that a subsequent BA is not lost.

In the communication technique the CF-End may be included in the TXOP field of the HE SIG A field. The largest HE-SIG A value (128 or 64) may indicate that the NAV is reset. This is the same operation that occurs when a CF-END frame is received. Moreover, the second largest value (127 or 63) may be reserved to indicate that the NAV is set to protect the following BA transmission.

Note that the NAV may be set to a predefined duration that is specified in the IEEE 802.11ax standard. For example, the NAV duration may be set to 120 μs. Moreover, the BA transmission may not take longer than this duration. This approach may be simple and may not consume much time.

Furthermore, the more data field in the quality-of-service control field of the MAC header can indicate a request for the receiver electronic device to send a CF-End frame. In particular, this bit may target a receiver to request that the receiver send the CF-End frame. For example, a non-access-point electronic device can set the field to '1' in a BA frame to request that the access point send a CF-End frame to reset the remainder of the TXOP. However, in some embodiments, there is a new dedicated field that indicates or specifies the NAV reset. When this new field is set to '1', the NAV may be set to the value indicated by the NAV reset (i.e., to a shorter value). Additionally, a value of '0' in the field may indicate normal NAV usage. As noted previously, in these embodiments the NAV may only be extended or increased.

Alternatively, the CF-End indication in the HE-SIG A field may be set using a separate or a different reserved bit in the HE-SIG A. In these embodiments, the field may indicate that a shorter NAV duration is used than in a previous frame. Note that the communication technique may define the CF-End indication or signaling when: only HE PPDUs are transmitted; a non-access-point electronic device has transmitted HE PPDUs, and the access point has transmitted a legacy PPDU (or when the CF-End frame transmission from an access point is enough to reset the NAV set by a non-access-point electronic device); and/or both sides or a connection have transmitted legacy PPDUs.

In particular, when only HE PPDUs transmitted, the CF-End indication may be included in the HE SIG-A field. In this way, electronic devices that only transmit HE PPDUs may avoid transmitting CF-End frames. This may lead to a net time saving of twice the short interframe space plus twice the duration of the CF-End frame (2·16 µs+2·(20 µs+28 µs)) or 128 µs. Consequently, the overhead is reduced and non-access-point electronic devices may return to the power-saving operating mode faster.

Figure 5:
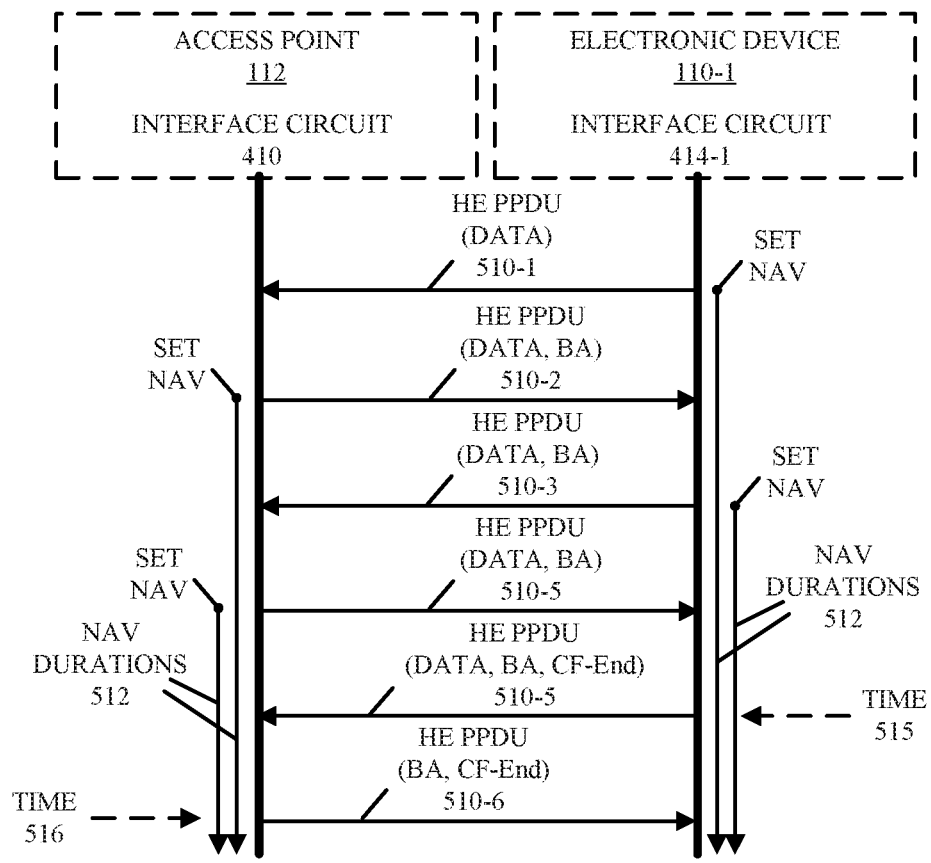
FIG. 5 is a flow diagram illustrating an example of communication between electronic devices, such as the electronic devices of FIG. 1.

FIG. 5 presents a flow diagram illustrating an example of communication between electronic device 110-1 and access point 112. In particular, HE PPDU frames 510-1, 510-2, 510-3 and 510-4 may include the NAV value, and which may indicate NAV durations 512. Moreover, HE PPDU frames 510-2, 510-3, 510-4, 510-5 and 510-6 may include BAs. Furthermore, HE PPDU frames 510-1, 510-2, 510-3, 510-4 and 510-5 may include data, and HE PPDU frames 510-5 and 510-6 may include a CF-End indication. Note that at time 514 the NAV is reset by HE electronic devices 110 (to protect the BA), and at time 516 the NAV is reset (set to zero) by HE electronic devices 110. In FIG. 5, the HE PPDU frames may be multi-user or single-user.

In contrast, in legacy operation, the HE PPDU frames are single-user and are transmitted uni-directionally from electronic devices 110-1 to access point 112. In response to receiving each HE PPDU frames, access point 112 transmits a BA. Then, electronic device 110-1 and access point 112 exchange CF-End frames.

Figure 6:
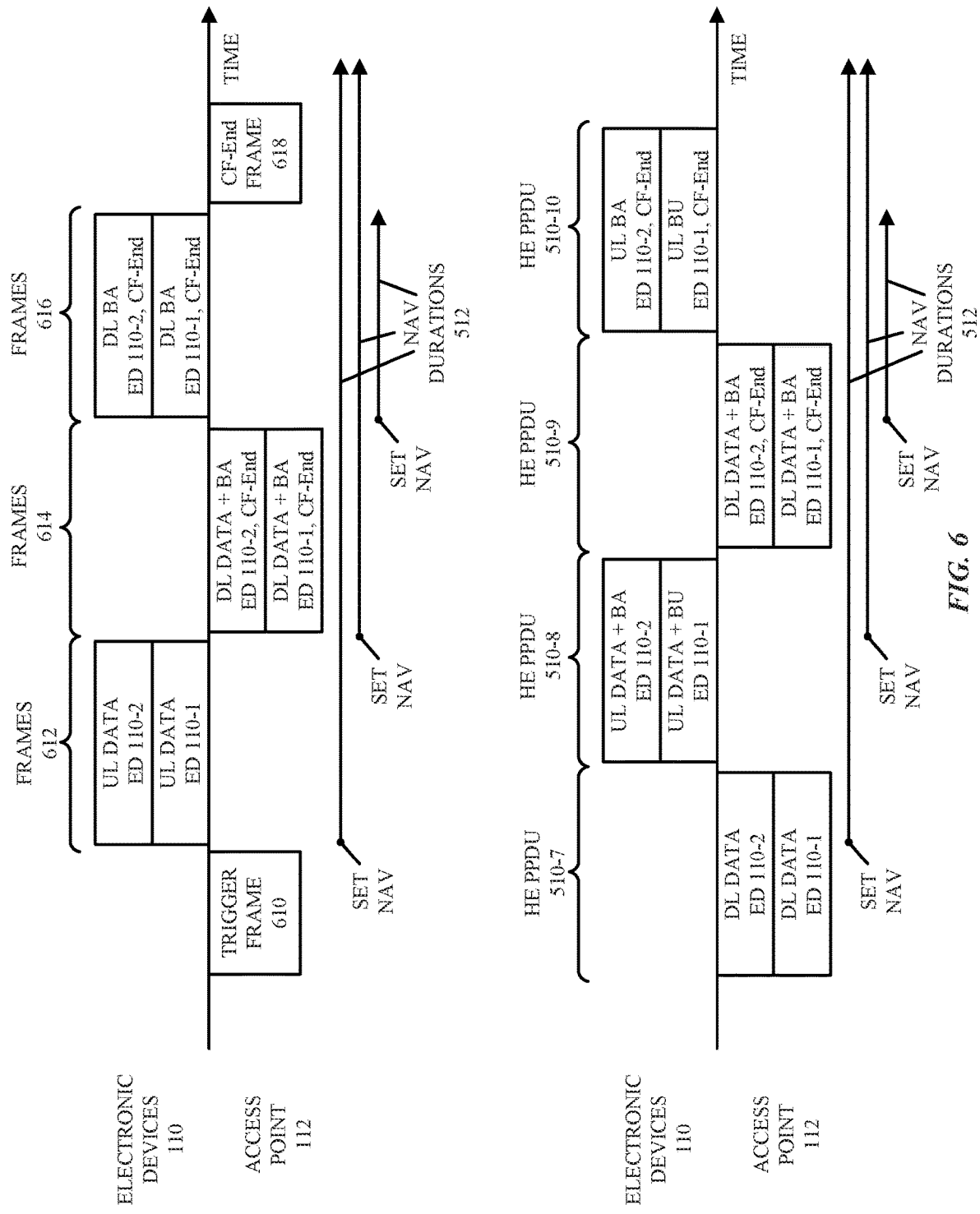
FIG. 6 is a timing diagram illustrating an example of communication between electronic devices, such as the electronic devices of FIG. 1.

FIG. 6 presents a timing diagram illustrating an example of communication between electronic devices 110 and access point 112. In multi-user transmissions, if electronic devices 110 are legacy electronic devices, they may obtain an initial one of NAV durations 512 from a trigger frame 610. Subsequently, electronic devices (ED) 110 may transmit up-link (UL) data frames 612. In addition, access point 112 may transmit downlink (DL) data, BAs and CF-End frames 614, and electronic devices 110 may respond with DL BA and CF-End frames 616. Finally, access point 112 may transmit a CF-End frame 618. Alternatively, in multi-user transmissions when only HE PPDUs 510 are transmitted, access point 112 may not transmit a CF-End frame.

Figure 7:
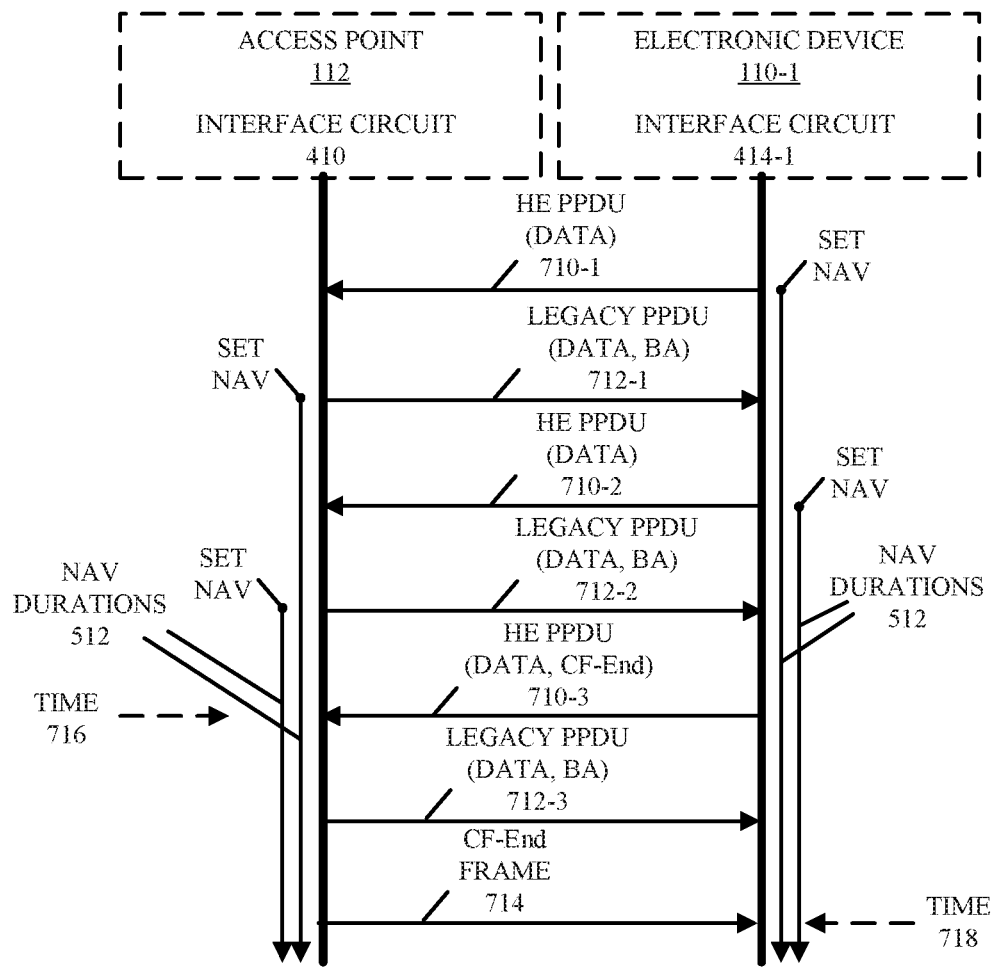
FIG. 7 is a flow diagram illustrating an example of communication between electronic devices, such as the electronic devices of FIG. 1.

In embodiments, where an electronic device has transmitted only HE PPDUs, the CF-End indication may also be included in the HE SIG-A field. This is illustrated in FIG. 7, which presents a flow diagram illustrating an example of communication between electronic device 110-1 and access point 112. In particular, electronic device 110-1 may have only transmitted HE PPDUs 710 and access point 112 may have transmitted one or more legacy (non-HE) PPDUs 712. The TXOP field of the HE-SIG A field of the HE PPDU may indicate that the NAV is reset to zero or a multi-traffic identifier (TID) BA from electronic device 110-1. In response, access point 112 may transmit a CF-End frame 714. Moreover, when electronic device 110-1 has not transmitted legacy frames, it may not need to send a CF-End frame to reset the NAV of the legacy electronic devices. This operation may be more likely to occur when an electronic device is transmitting single-user PPDUs to an HE access point. Note that a multi-TID BA may require a shorter PPDU and, therefore, may be more efficient to transmit. In addition, note that at time 716 the NAV is reset by HE electronic devices 110 (to protect the BA), and at time 718 the NAV is reset (set to zero) by all the electronic devices in the WLAN.

When both the access point and the non-access-point electronic device have transmitted legacy frames in a TXOP, CF-End frames may be transmitted. For example, the electronic devices may have used request-to-send (RTS) and clear-to-send (CTS) signaling to initiate the TXOP. However, both the access point and the non-access-point electronic device may transmit a CF-End frame to reset the NAV. If the non-access-point electronic device is allowed to return to the power-saving operating mode, the non-access-point electronic device may transmit the CF-End frame first. This approach may save or avoid the short interframe space (SIFS) and the CF-End frame duration from the amount of time the non-access-point electronic device is awake or in the active operating mode. Alternatively, if the NAV termination around the electronic device is not considered important, only the access point may transmit the CF-End frame.

Figure 8:
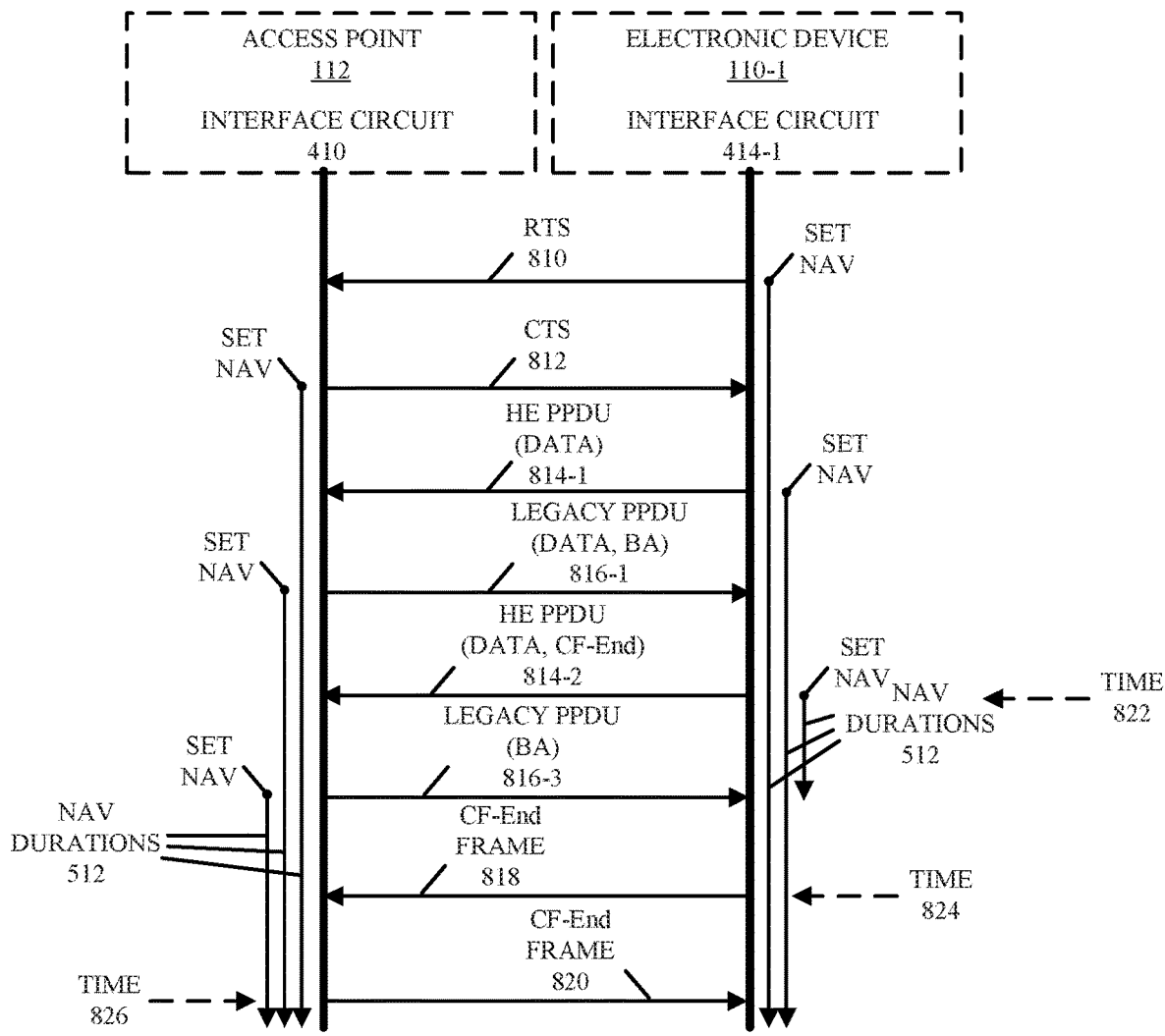
FIG. 8 is a flow diagram illustrating an example of communication between electronic devices, such as the electronic devices of FIG. 1.

FIG. 8 presents a flow diagram illustrating an example of communication between electronic device 110-1 and access point 112. In FIG. 8, electronic device 110-1 transmits RTS 810 and access point 112 responds with CTS 812. Then, electronic device 110-1 transmits HE PPDUs 814 and access point 112 responds with legacy PPDUs 816. Finally, electronic device 110-1 and access point 112 transmit CF-End frames 818 and 820, respectively. Note that at time 822 the NAV is reset by HE electronic devices 110 (to protect the BA). Then, at times 824 and 826 the NAV is reset (set to zero) by all the electronic devices in the WLAN. Note that electronic device 110-1 may transition to a power-saving mode before CF-End frame 820 is received.

Figure 9:
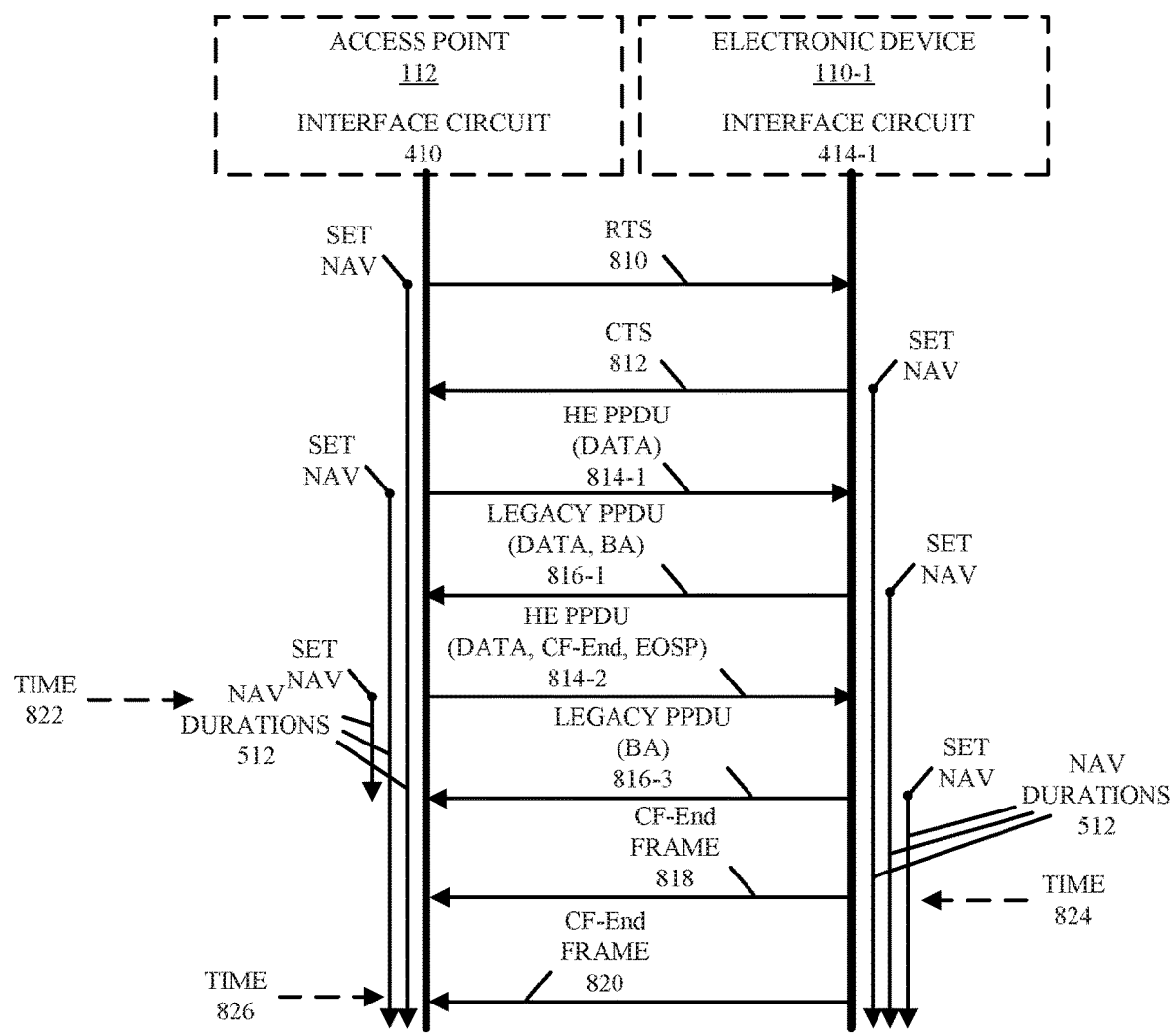
FIG. 9 is a flow diagram illustrating an example of communication between electronic devices, such as the electronic devices of FIG. 1.

FIG. 9 presents a flow diagram illustrating an example of communication between electronic device 110-1 and access point 112. In FIG. 9, access point 112 transmits RTS 810 and electronic device 110-1 responds with CTS 812. Then, access point 112 transmits HE PPDUs 814 and electronic device 110-1 responds with legacy PPDUs 816. Finally, electronic device 110-1 and access point 112 transmit CF-End frames 818 and 820, respectively. Note that at time 822 the NAV is reset by HE electronic devices 110 (to protect the BA). Then, at times 824 and 826 the NAV is reset (set to zero) by all the electronic devices in the WLAN. In addition, note that an end of service period (EOSP) is transmitted from access point 112 to electronic device 110-1 in HE PPDU 814-2. Finally, note that the different order of the CF-End frames 818 and 820 in FIG. 9 versus FIG. 8.

We now describe access-point stealing or terminating up-link TXOPs to acquire the shared channel for a multi-user transmission. The access point may receive a single-user PPDU transmission from an associated electronic device (or station). The access point may know that the target wake time (TWT) schedule may start soon. Consequently, the access point may acquire the TXOP to transmit a trigger frame. However, currently an access point may not have a mechanism for stopping the electronic device from transmitting up-link single-user data in order to transmit the multi-user transmission or the trigger frame. The delay associated with obtaining the TXOP for the multi-user transmission may result in higher power consumption for many electronic devices and may lower the network throughput.

For example, during unmanaged high-density operation, it may be difficult to allow the access point to have higher priority to send a trigger frame for multiple multi-user transmitters. However, by silencing its own basic service set, the access point may obtain more opportunities to transmit for overlapping basic services sets. Moreover, by lowering the EDCA parameters, the access point may improve the performance of the overlapping basic service sets.

Thus, after an electronic device has transmitted single-user transmission with data during a TWT, an access point may take the TXOP in the subsequent BA. Then, the access point may transmit data to multiple electronic devices using a multi-user transmission, and may receive BAs from these electronic devices using a multi-user transmission.

Two approaches for an access point to take the TXOP and to transmit the trigger are described. In particular, the access point may be allowed to terminate an ongoing up-link TXOP in its basic service set (BSS) to release the shared channel for a multi-user transmission. In one approach, the access point may terminate the ongoing TXOP and may compete anew for the TXOP for a multi-user transmission. Alternatively, the access point may operate within the TXOP owned by the electronic device and may take the TXOP ownership from this electronic device. The first approach may be fair for all electronic devices and each transmission may compete according to EDCA rules. Moreover, the second approach may be more efficient because the TXOP termination signaling is not needed. Note that there may be a mechanism to voluntarily allow the access point to use the remaining TXOP duration.

Figure 10:
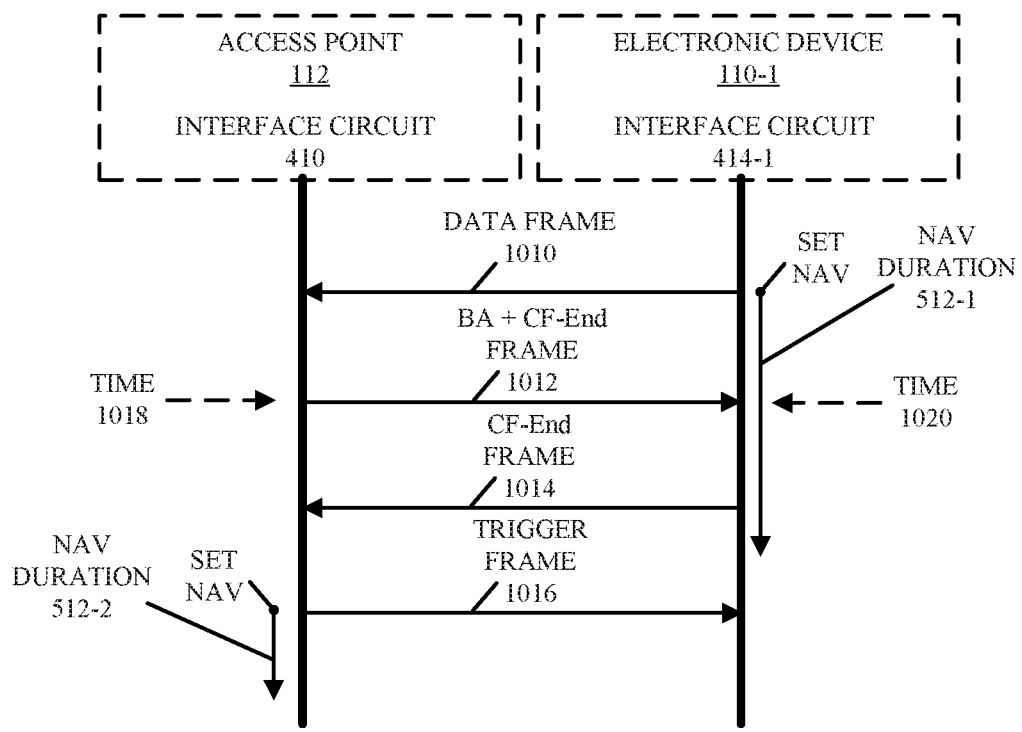
FIG. 10 is a flow diagram illustrating an example of communication between electronic devices, such as the electronic devices of FIG. 1.

Thus, the access point may be able to terminate the ongoing TXOP. This is illustrated in FIG. 10, which presents a flow diagram illustrating an example of communication between electronic device 110-1 and access point 112. In particular, electronic device 110-1 may send up-link data 1010 to access point 112. In response, access point 112 may transmit BA frame having a CF-End indication 1012 indicating that the TXOP is terminated. If electronic device 110-1 has send a legacy MAC Protocol Data Unit (MPDU) during the TXOP, electronic device 110-1 may transmit a CF-End frame 1014 to terminate its ongoing TXOP for legacy electronic devices. Note that electronic device 110-1 may not be allowed to send any other frame during the TXOP. Moreover, the received BA frame with the CF-End indication 1012 may set a short duration to the HE electronic devices 110 in the BSS when the HE electronic devices 110 are not allowed to access the shared channel. This may help access point 112 to obtain the shared channel for trigger frame 1016 transmission. Thus, access point 112 may compete for TXOP and may transmit trigger frame 1016. Note that the NAV is reset at times 1018 and 1020. While BA frame having the CF-End indication 1012 is drawn as a horizontal line in FIG. 10, the speed of light is finite so time 1020 is later than time 1018.

Figure 11:
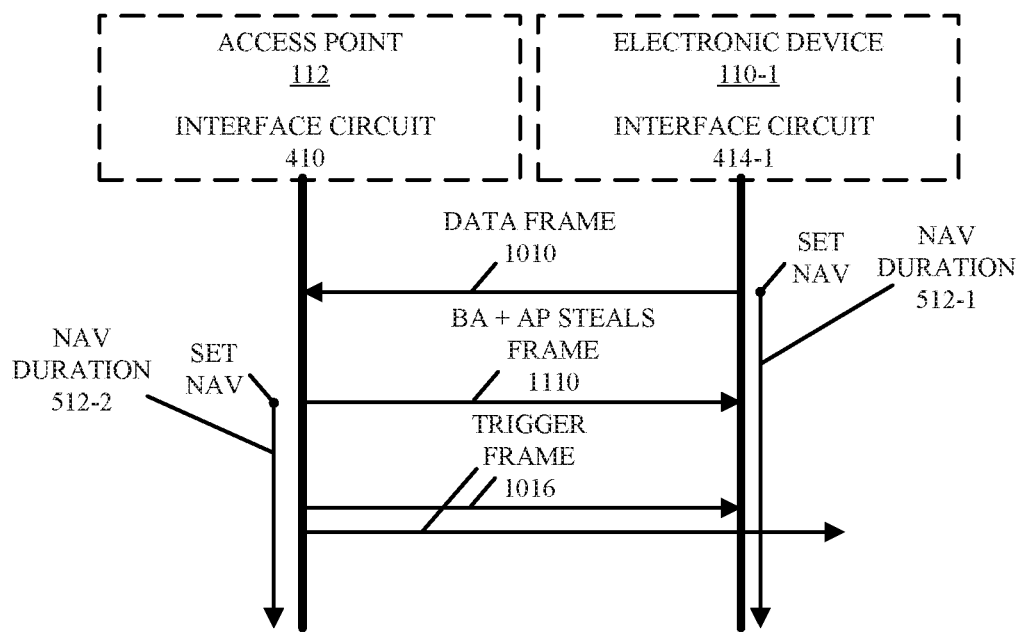
FIG. 11 is a flow diagram illustrating an example of communication between electronic devices, such as the electronic devices of FIG. 1.

Alternatively or additionally, access point 112 may take over the remaining time in the TXOP. This is shown in FIG. 11, which presents a flow diagram illustrating an example of communication between electronic device 110-1 and access point 112. In particular, electronic device 110-1 may send up-link data 1010 to access point 112. In response, access point 112 may transmit BA 1112 having an access point (AP) steals field in the MAC header that indicates that access point 112 takes over the TXOP. Consequently, electronic device 110-1 may not be allowed to continue transmissions in the TXOP. Next, access point 112 may transmit trigger frame 1016, using a multi-user or a single-user transmission, to electronic device 110-1 and/or another electronic device. Note that the PPDU may contain information or MAC Protocol Data Units (MPDUs) to multiple receivers. Moreover, data 1010 frame may contain an RDG field that is set to '1' to indicate that access point 112 is allowed to transmit reverse direction data to electronic device 110-1.

Figure 12:
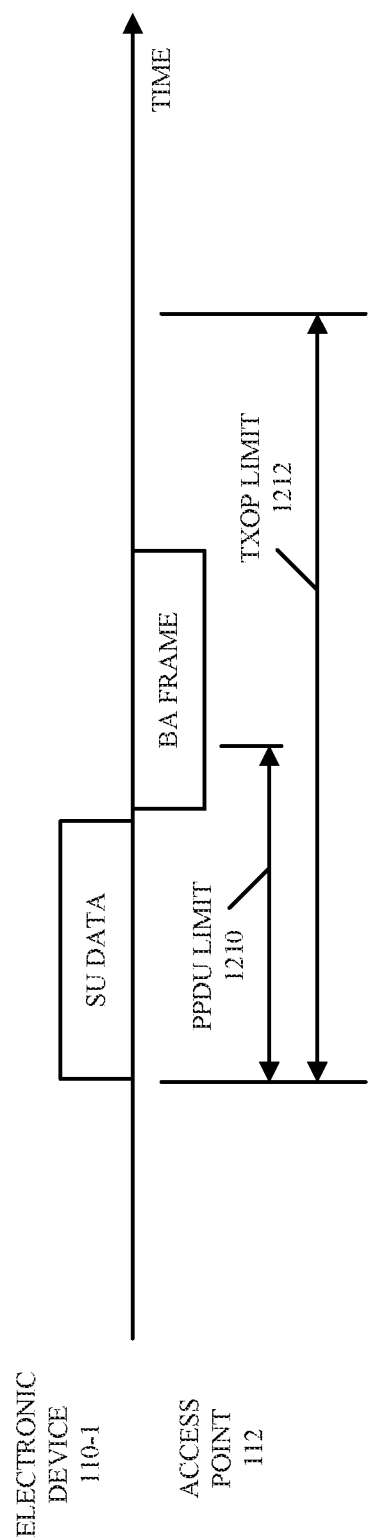
FIG. 12 is a timing diagram illustrating an example of communication between electronic devices, such as the electronic devices of FIG. 1.

In some embodiments, a PLCP protocol data unit (PPDU) duration limit is added to the EDCA parameters. FIG. 12 presents a timing diagram illustrating an example of communication between electronic device 110-1 and access point 112. In particular, access point 112 may limit the up-link single-user PPDU duration or limit 1210 per access category (AC) duration by transmitting the parameter as part of a beacon, a probe response or an association response frame. In response, access point 112 may define a maximum up-link single-user PPDU duration for each AC. This parameter may define the maximum PPDU duration that may be transmitted by electronic device 110-1. Furthermore, access point 112 may allow electronic device 110-1 to use a non-limited PPDU duration. Access point 112 may also transmit a data frame or BA to electronic device 110-1 containing a PPDU LimitControl bit in the MAC header that indicates that electronic device 110-1 may use any PPDU duration during the remainder of TXOP duration or limit 1212. Note that the short PPDU may allow access point 112 to acquire the TXOP from electronic device 110-1 faster (because access point 112 knows the PPDU duration it may not need to take over the TXOP), but it may increase the system overhead from many SIFS, preamble and BA frames.

Figure 13:
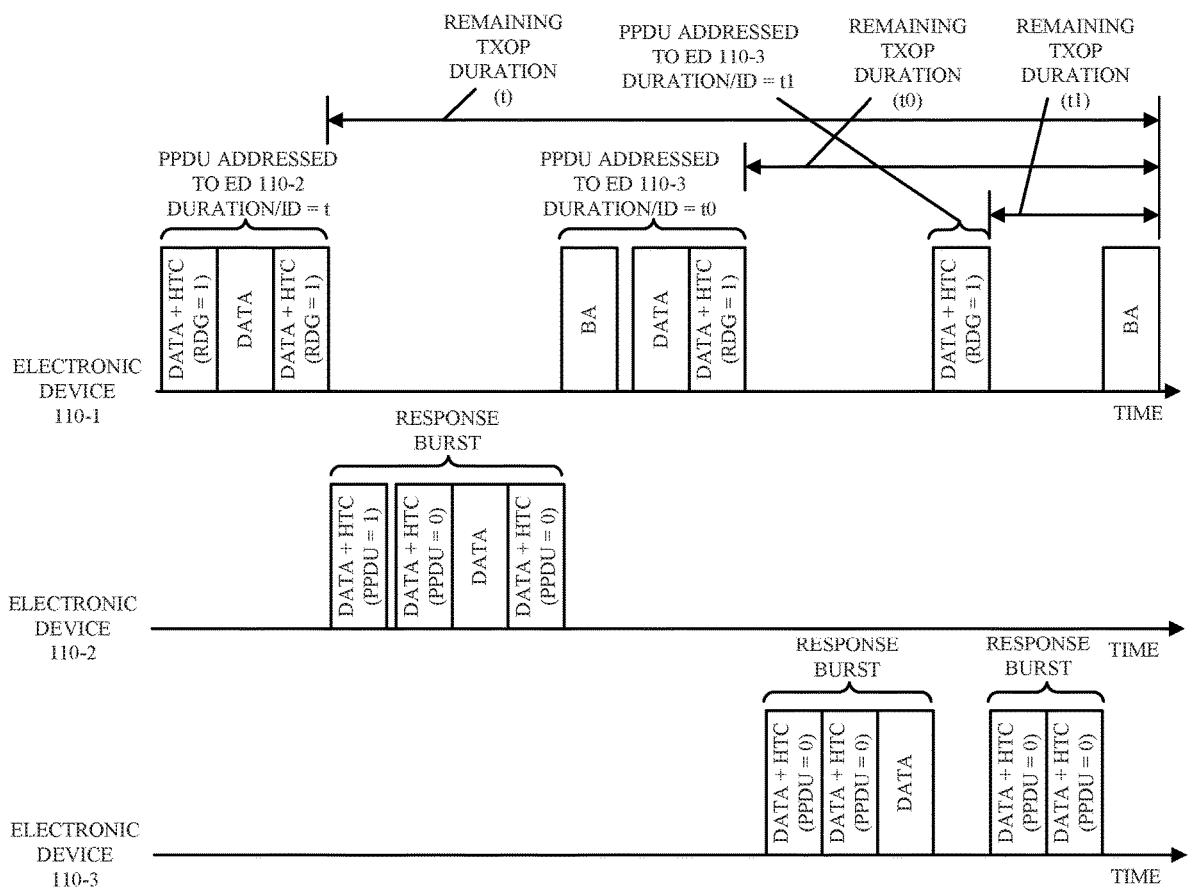
FIG. 13 is a timing diagram illustrating an example of communication between electronic devices, such as the electronic devices of FIG. 1.

We now describe an RDG enhancement for more efficient single-user communication. FIG. 13 presents a timing diagram illustrating an example of communication between electronic devices 110. Note that RDG may allow a responder to transmit BAs and data PPDUs during the TXOP initiated by a TXOP holder.

In particular, during RDG, the TXOP holder may control whether the receiver may send data during the TXOP and BAs as a response. For example, the TXOP holder can set RDG equal to '1' in a MAC header so an RD responder can transmit for the remainder of the TXOP (which may eliminate a need to compete for the shared channel). The RD responder may transmit the MPDUs back to the TXOP holder. Moreover, the RD responder may transmit multiple PPDUs and the last PPDU may contain or include an indication that the TXOP holder is allowed to transmit. Note that the RD transmission technique may fit or be useful in embodiments where the access point grants the reverse direction TXOP to electronic devices. Furthermore, the transmission mode may not allow the electronic device to move the TXOP to the access point. This may avoid NAV release signaling and new TXOP competition overhead. Additionally, in this approach fairness is maintained and the total duration of the TXOP may not exceed the TXOPLimit. Table 1 provides an example of information that specifies an RDG.

TABLE 1

| Value | Role of Transmitting Electronic Device | Interpretation |
| --- | --- | --- |
| 0 | Not an RD responder | No reverse grant |
|  | RD responder | The PPDU carrying the frame is the last transmission by the RD responder |
| 1 | RD initiator | An RDG is present |
|  | RD responder | The PPDU carrying the frame is followed by another PPDU |

Figure 14:
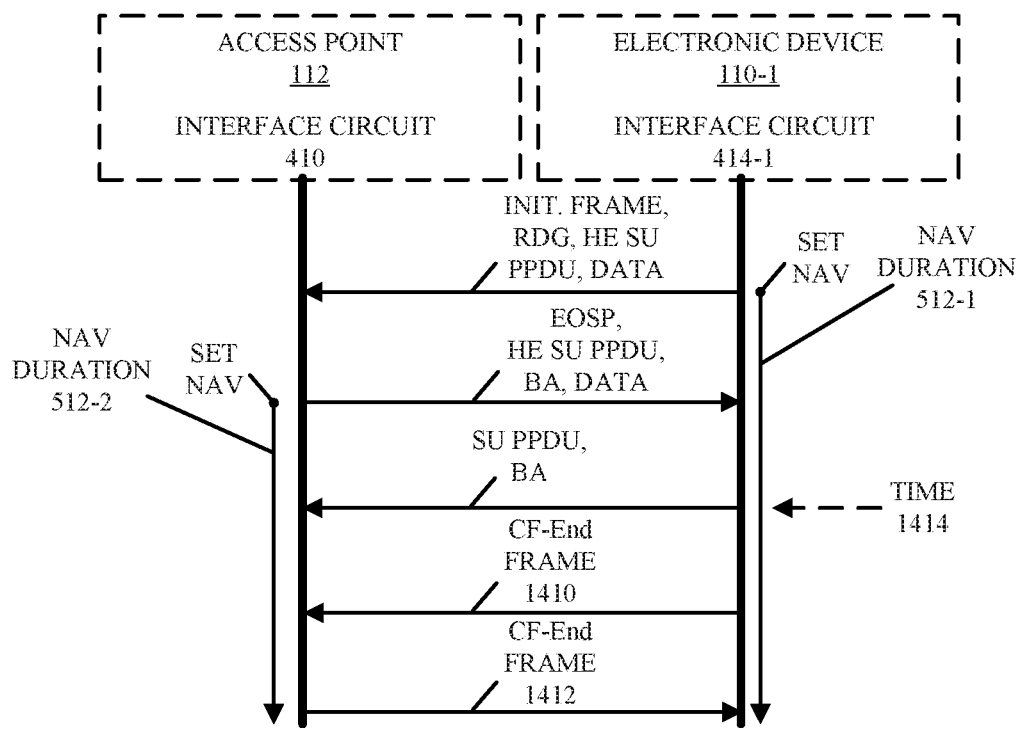
FIG. 14 is a flow diagram illustrating an example of communication between electronic devices, such as the electronic devices of FIG. 1.

There are, however, some challenges associated with this existing approach to RDG. In particular, the RDG allows the receiving electronic device to transmit BAs and data frames within the remaining TXOP duration. In a power-saving operating mode, a non-access-point electronic device may send a U-APSD (automatic power save delivery) service period initiation (init.) frame and may likely allocate the whole TXOP duration transmission time to the access point in response. This may maximize the amount of data that the access point can transmit to the electronic device. If access point does not have much data stored for a power-saving electronic device, the access point may only use part of the allocated transmission time and may enable the electronic device to return to the power-saving operating mode by setting the EOSP field. Moreover, when the electronic device gets a response from the access point, it may be likely that the electronic device transmits a BA and returns to power-saving operating mode. However, the allocated transmission time may be wasted for other electronic devices. In addition to additional overhead, this approach may involve fast operations occurring in the same TXOP. Note that freeing the allocated NAV duration may not be power optimized for the electronic device. As shown in FIG. 14, which presents a flow diagram illustrating an example of communication between electronic device 110-1 and access point 112, electronic device 110-1 may need to transmit and receive additional CF-End frames 1410 and 1412, which is added overhead. In addition, at time 1414, electronic device 110-1 may enter a power-saving operating mode (such as a sleep mode).

Figure 15:
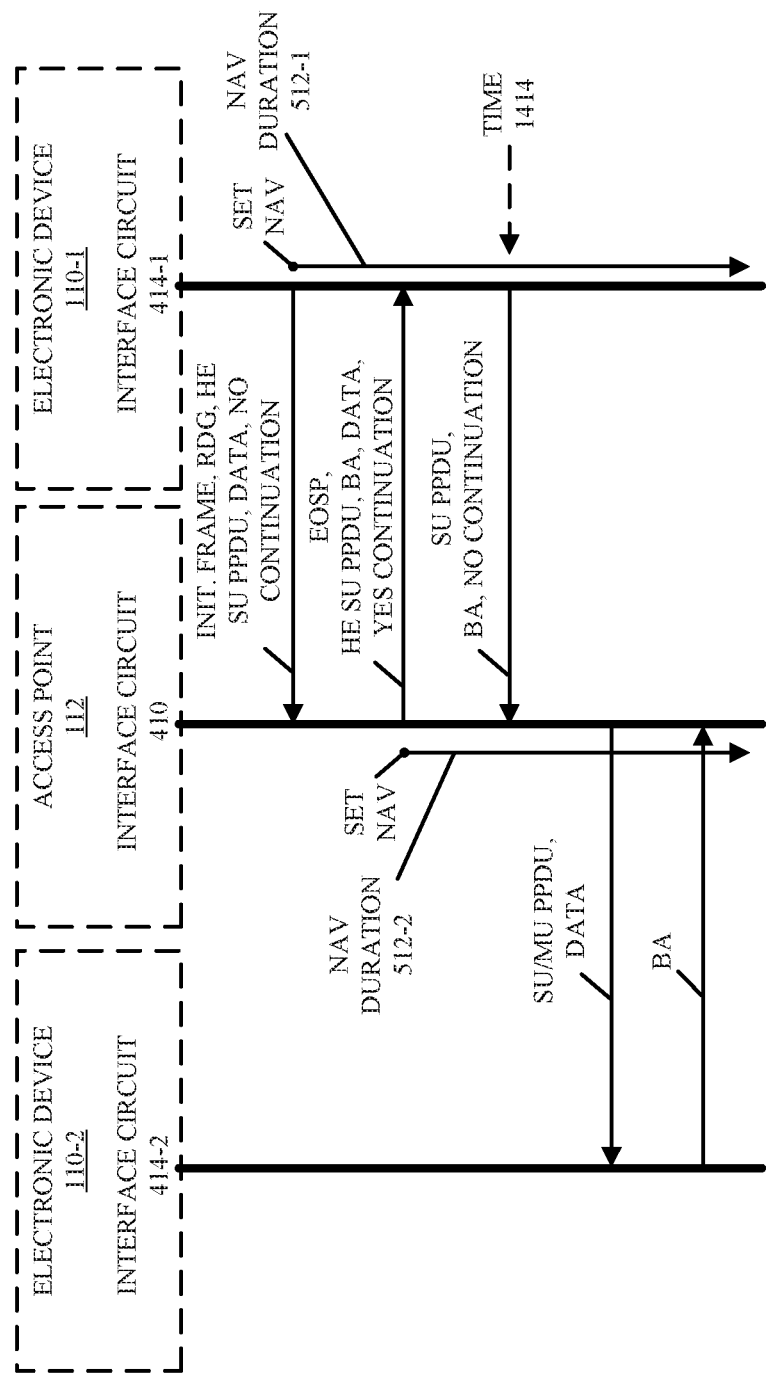
FIG. 15 is a flow diagram illustrating an example of communication between electronic devices, such as the electronic devices of FIG. 1.
Figure 16:
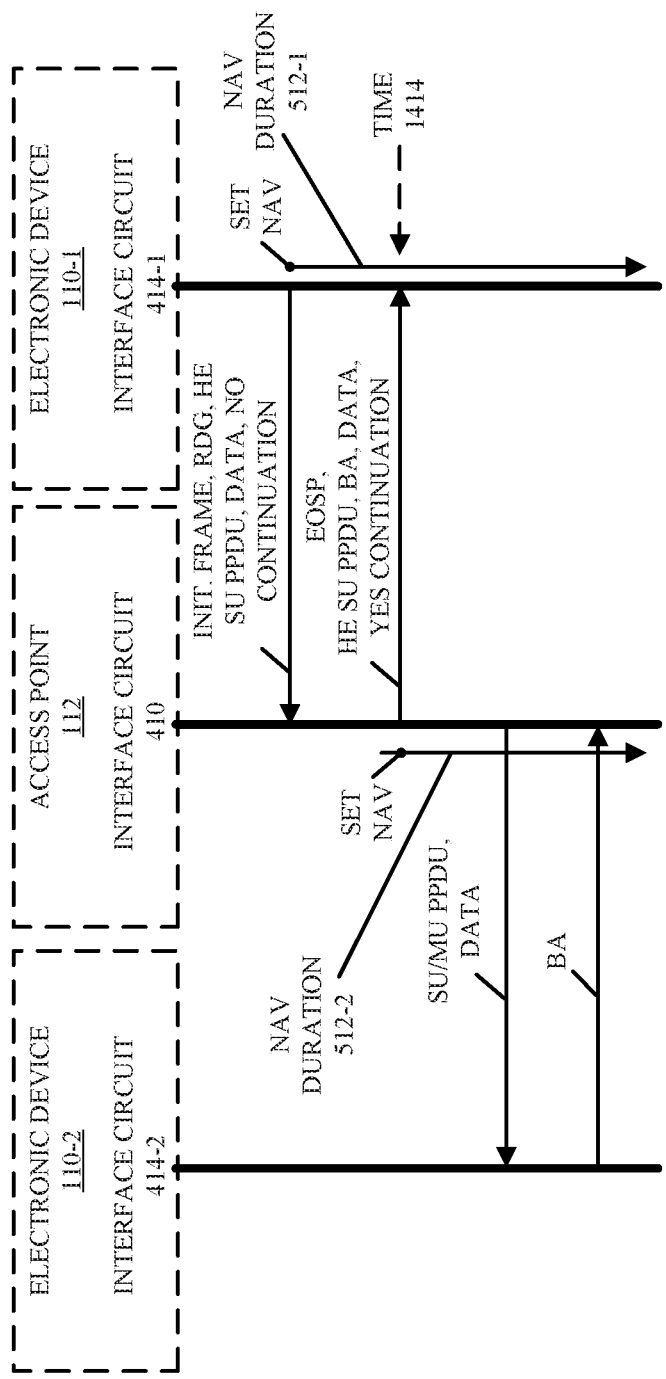
FIG. 16 is a flow diagram illustrating an example of communication between electronic devices, such as the electronic devices of FIG. 1.

In some embodiments, the access point takes over the TXOP by setting a continuation bit(s) in an HT control field or a MAC header, the network is busy and the already reserved transmission time is used for down-link transmission. An embodiment with RDG with data is shown in FIG. 15, which presents a flow diagram illustrating an example of communication between electronic devices 110 and access point 112. Alternatively, an embodiment where there is only a BA is shown in FIG. 16, which presents a flow diagram illustrating an example of communication between electronic devices 110 and access point 112. Note that access point 112 may determine whether multi-user or single-user transmission is used.

Figure 17:
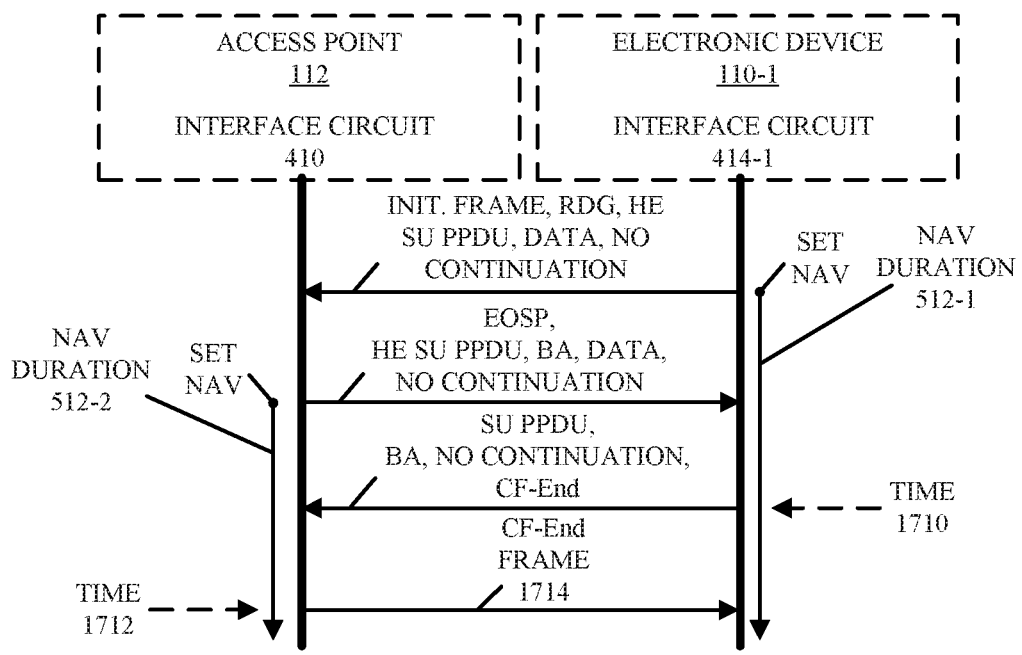
FIG. 17 is a flow diagram illustrating an example of communication between electronic devices, such as the electronic devices of FIG. 1.

In another example, the access point may not be interested to continue TXOP and the network is likely lightly loaded. However, it still may be useful to release unused resource to mitigate delays and increase throughput. An embodiment with RDG with data is shown in FIG. 17, which presents a flow diagram illustrating an example of communication between electronic device 110-1 and access point 112. In FIG. 17, at time 1710, the NAV may be reset to HE electronic devices 110 and electronic device 110-1 may enter a power-saving operation mode. Moreover, at time 1712, the NAV in access point 112 is reset and this reset may be communicated to legacy electronic devices in the WLAN. Note that CF-End frame 1714 may be optional.

Figure 18:
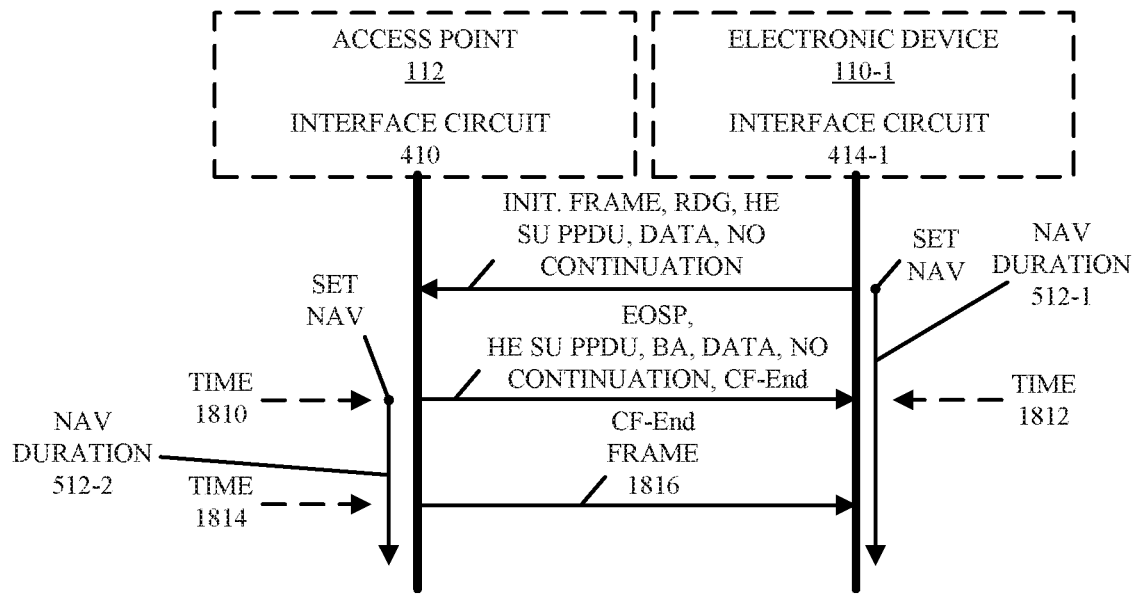
FIG. 18 is a flow diagram illustrating an example of communication between electronic devices, such as the electronic devices of FIG. 1.

Alternatively, an embodiment where there is only a BA is shown in FIG. 18, which presents a flow diagram illustrating an example of communication between electronic device 110-1 and access point 112. In FIG. 18, at time 1810, the NAV may be reset to HE electronic devices 110. Then, at time 1812, electronic device 110-1 may enter a power-saving operation mode. Moreover, at time 1814, the NAV in access point 112 is reset and this reset may be communicated to legacy electronic devices in the WLAN. Note that CF-End frame 1816 may be optional.

The RDG signaling may be included in a continue subfield. In some embodiments, the continue field is in a HT control field as shown in Table 2. Alternatively, as shown in Table 3, the continue field may be the more data field in the MAC Header.

TABLE 2

| Reserve | Continue | AC Constraint | RDG/More PPDU |
|---------|----------|---------------|---------------|
| 5 | 1 | 1 | 1 |

TABLE 3

| Continue Field in RDG Indication | Continue Field in RD Responder | Explanation | RD Responder NAV Setting |
|---|---|---|---|
| 0 | 0 | The RD initiator does not desire to continue the TXOP to transmit other frames; the RD responder does not desire to use the remaining TXOP for its own transmissions | If the responder transmits only a BA, the NAV is set to 0 and the CF-End bit is set to 1 |
| 0 | 1 | The RD initiator does not desire to continue the TXOP to transmit other frames; and the RD responder desires to use the remaining TXOP for its own transmissions | The RD responder reduces the duration of the PPDUs it transmits from the NAV value |
| 1 | 0 | The RD initiator desires to continue TXOP; and the RD responder does not desire to continue the TXOP | The RD responder reduces the duration of the PPDUs it transmits from the NAV value |
| 1 | 1 | Both the RD initiator and RD responder desire to continue the TXOP; the RDG transmission flow allows the RD initiator to continue its TXOP; and for infrastructure networks, the TXOP continuation may be given to the access point | The RD responder reduces the duration of the PPDUs it transmits from the NAV value |

Note that the RDG embodiments may reduce or minimize the power consumption of the electronic devices. Moreover, for lightly loaded networks, the transmission flow may offer the lowest power consumption in all transmission techniques. Furthermore, the access point can use the remaining TXOP duration. By allowing TXOP continuation in the access point, the signaling overhead associated with releasing the NAV can be avoided. In addition, because the NAV only protects the time for data exchange, the overhead is minimized, especially for the exchange of HE frames.

We now describe embodiments of an electronic device. FIG. 19 presents a block diagram of an electronic device 1900 (which may be an access point, another electronic device, such as a station or a legacy electronic device) in accordance with some embodiments. This electronic device includes processing subsystem 1910, memory subsystem 1912, and networking subsystem 1914. Processing subsystem 1910 includes one or more devices configured to perform computational operations. For example, processing subsystem 1910 can include one or more microprocessors, application-specific integrated circuits (ASICs), microcontrollers, programmable-logic devices, and/or one or more digital signal processors (DSPs).

Memory subsystem 1912 includes one or more devices for storing data and/or instructions for processing subsystem 1910 and networking subsystem 1914. For example, memory subsystem 1912 can include dynamic random access memory (DRAM), static random access memory (SRAM), a read-only memory (ROM), flash memory, and/or other types of memory. In some embodiments, instructions for processing subsystem 1910 in memory subsystem 1912 include: one or more program modules or sets of instructions (such as program module 1922 or operating system 1924), which may be executed by processing subsystem 1910. For example, a ROM can store programs, utilities or processes to be executed in a non-volatile manner, and DRAM can provide volatile data storage, and may store instructions related to the operation of electronic device 1900. Note that the one or more computer programs may constitute a computer-program mechanism, a computer-readable storage medium or software. Moreover, instructions in the various modules in memory subsystem 1912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1910. In some embodiments, the one or more computer programs are distributed over a network-coupled computer system so that the one or more computer programs are stored and executed in a distributed manner.

In addition, memory subsystem 1912 can include mechanisms for controlling access to the memory. In some embodiments, memory subsystem 1912 includes a memory hierarchy that comprises one or more caches coupled to a memory in electronic device 1900. In some of these embodiments, one or more of the caches is located in processing subsystem 1910.

In some embodiments, memory subsystem 1912 is coupled to one or more high-capacity mass-storage devices (not shown). For example, memory subsystem 1912 can be coupled to a magnetic or optical drive, a solid-state drive, or another type of mass-storage device. In these embodiments, memory subsystem 1912 can be used by electronic device 1900 as fast-access storage for often-used data, while the mass-storage device is used to store less frequently used data.

Figure 19:
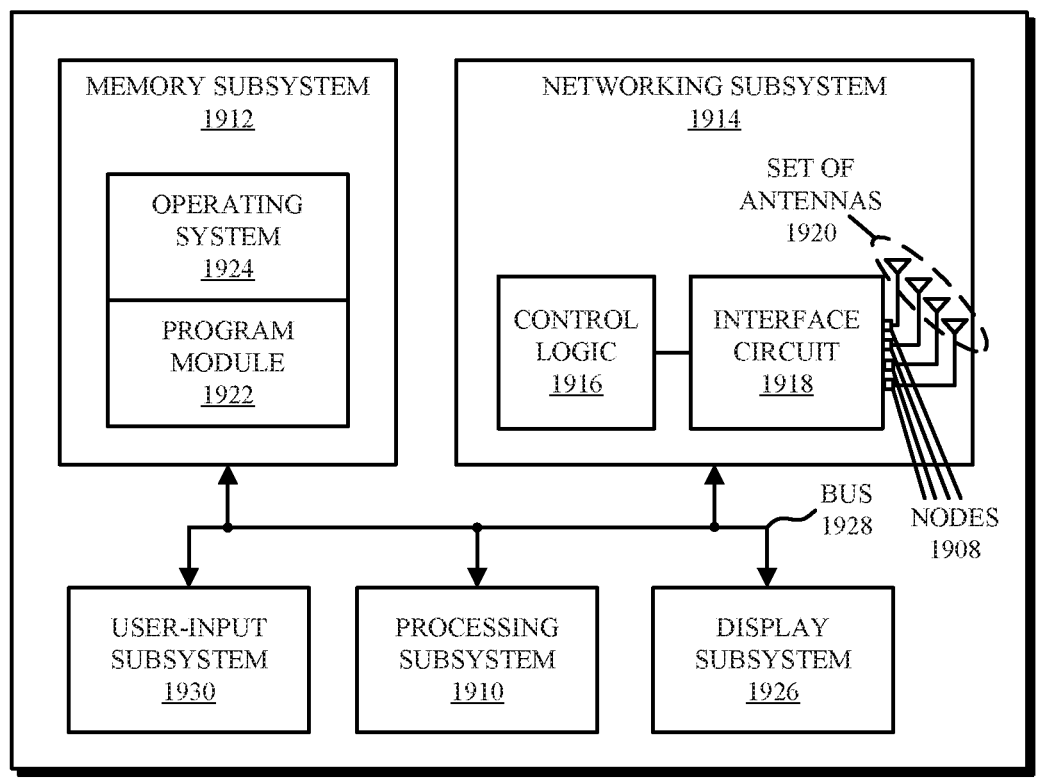
FIG. 19 is a block diagram illustrating an example of one of the electronic devices of FIG. 1.

Networking subsystem 1914 includes one or more devices configured to couple to and communicate on a wired and/or wireless network (i.e., to perform network operations), including: control logic 1916, an interface circuit 1918 and a set of antennas 1920 (or antenna elements) in an adaptive array that can be selectively turned on and/or off by control logic 1916 to create a variety of optional antenna patterns or 'beam patterns.' (While FIG. 19 includes set of antennas 1920, in some embodiments electronic device 1900 includes one or more nodes, such as nodes 1908, e.g., a pad, which can be coupled to set of antennas 1920. Thus, electronic device 1900 may or may not include set of antennas 1920.) For example, networking subsystem 1914 can include a Bluetooth® networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1900 may use the mechanisms in networking subsystem 1914 for performing simple wireless communication between the electronic devices, e.g., transmitting advertising or beacon frames and/or scanning for advertising frames transmitted by other electronic devices.

Within electronic device 1900, processing subsystem 1910, memory subsystem 1912, and networking subsystem 1914 are coupled together using bus 1928 that facilitates data transfer between these components. Bus 1928 may include an electrical, optical, and/or electro-optical connection that the subsystems can use to communicate commands and data among one another. Although only one bus 1928 is shown for clarity, different embodiments can include a different number or configuration of electrical, optical, and/or electro-optical connections among the subsystems.

In some embodiments, electronic device 1900 includes a display subsystem 1926 for displaying information on a display, which may include a display driver and the display, such as a liquid-crystal display, a multi-touch touchscreen, etc. Display subsystem 1926 may be controlled by processing subsystem 1910 to display information to a user (e.g., information relating to incoming, outgoing, or an active communication session).

Electronic device 1900 can also include a user-input subsystem 1930 that allows a user of the electronic device 1900 to interact with electronic device 1900. For example, user-input subsystem 1930 can take a variety of forms, such as: a button, keypad, dial, touch screen, audio input interface, visual/image capture input interface, input in the form of sensor data, etc.

Electronic device 1900 can be (or can be included in) any electronic device with at least one network interface. For example, electronic device 1900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1900, in alternative embodiments, different components and/or subsystems may be present in electronic device 1900. For example, electronic device 1900 may include one or more additional processing subsystems, memory subsystems, networking subsystems, and/or display subsystems. Additionally, one or more of the subsystems may not be present in electronic device 1900. Moreover, in some embodiments, electronic device 1900 may include one or more additional subsystems that are not shown in FIG. 19. Also, although separate subsystems are shown in FIG. 19, in some embodiments some or all of a given subsystem or component can be integrated into one or more of the other subsystems or component(s) in electronic device 1900. For example, in some embodiments program module 1922 is included in operating system 1924 and/or control logic 1916 is included in interface circuit 1918.

Moreover, the circuits and components in electronic device 1900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1914. This integrated circuit may include hardware and/or software mechanisms that are used for transmitting wireless signals from electronic device 1900 and receiving signals at electronic device 1900 from other electronic devices. Aside from the mechanisms herein described, radios are generally known in the art and hence are not described in detail. In general, networking subsystem 1914 and/or the integrated circuit can include any number of radios. Note that the radios in multiple-radio embodiments function in a similar way to the described single-radio embodiments.

In some embodiments, networking subsystem 1914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1922, operating system 1924 (such as a driver for interface circuit 1918) or in firmware in interface circuit 1918. Alternatively or additionally, at least some of the operations in the communication technique may be implemented in a physical layer, such as hardware in interface circuit 1918. In an exemplary embodiment, the communication technique is implemented, at least in part, in a MAC layer and/or in a physical layer in interface circuit 1918.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more nodes configured to communicatively couple to an antenna; and
   an interface circuit, communicatively coupled to the one or more nodes, configured to communicate with a second electronic device using a Wi-Fi communication protocol, and configured to:
   transmit a data frame to the second electronic device, a preamble of the data frame including information cancelling a previously specified network allocation vector (NAV) protected time,
   wherein the data frame does not comprise a contention free (CF)-end control frame.

2. The electronic device of claim 1, wherein the electronic device comprises an access point in a wireless local area network (WLAN).

3. The electronic device of claim 1, wherein the information includes a CF-End indication.

4. The electronic device of claim 1, wherein the information is included in a medium access control (MAC) header of the data frame.

5. The electronic device of claim 4, wherein the information is included in a high-efficiency (HE) SIG-A field in the MAC header.

6. The electronic device of claim 5, wherein the information is included in a transmit opportunity (TXOP) field in the HE SIG-A field.

7. The electronic device of claim 1, wherein the information is included in the preamble of a high-efficiency (HE) physical layer convergence protocol (PLCP) protocol data unit (PPDU).

8. The electronic device of claim 1, wherein the interface circuit is further configured to:

transmit the data frame in response to receiving a block acknowledgment (BA) from the second electronic device.

9. The electronic device of claim 1, wherein the Wi-Fi communication protocol is compatible with an Institute of Electrical and Electronics Engineers (IEEE) 801.11 ax standard.

10. The electronic device of claim 1, wherein the interface circuit is configured to include additional information in a second frame to indicate a reverse direction grant (RDG) transmit opportunity (TXOP) that releases previously specified NAV protected time and enables the electronic device to transmit data during a TXOP of the second electronic device.

11. The electronic device of claim 1, wherein the interface circuit is further configured to:
   determine that the second electronic device is a legacy electronic device that does not support including the information in the data frame; and
   transmit a CF-End frame to the second electronic device based on the determination.

12. The electronic device of claim 1, wherein the electronic device further comprises the antenna.

13. A non-transitory computer-readable storage medium storing instructions that, when executed by an interface circuit included in an electronic device, cause the electronic device to transmit a data frame to a second electronic device using a Wi-Fi communication protocol, by carrying out one or more operations that comprise:
   transmitting the data frame to the second electronic device, a preamble of the data frame including a contention free (CF)-End indication cancelling a previously specified network allocation vector (NAV) protected time,
   wherein the data frame does not comprise a CF-End control frame.

14. The non-transitory computer-readable storage medium of claim 13, wherein the CF-End indication is included in a media access control (MAC) header of the data frame.

15. The non-transitory computer-readable storage medium of claim 14, wherein the CF-End indication is included in a transmit opportunity (TXOP) field in a high-efficiency (HE) SIG-A field in the MAC header.

16. The non-transitory computer-readable storage medium of claim 13, wherein the CF-End indication is included in the preamble of a high-efficiency (HE) physical layer convergence protocol (PLCP) protocol data unit (PPDU).

17. The non-transitory computer-readable storage medium of claim 13, wherein the one or more operations further comprise:
   transmitting the data frame responsive to receiving a block acknowledgment (BA) from the second electronic device.

18. The non-transitory computer-readable storage medium of claim 13, wherein the one or more operations include adding additional information in a second frame to indicate a reverse direction grant (RDG) transmit opportunity (TXOP) that releases previously specified NAV protected time and enables the electronic device to transmit data during a TXOP of the second electronic device.

19. The non-transitory computer-readable storage medium of claim 13, wherein the one or more operations further comprise:
   determining that the second electronic device is a legacy electronic device that does not support including the CF-End indication in the data frame; and
   transmitting a CF-End frame to the second electronic device based on the determination.

20. A method for transmitting a data frame to a second electronic device using a Wi-Fi communication protocol, the method comprising:
   using an interface circuit in an electronic device:
      receiving a block acknowledgment (BA) from the second electronic device; and
      transmitting the data frame to the second electronic device, a preamble of the data frame including information cancelling a previously specified network allocation vector (NAV) protected time,
      wherein the data frame does not comprise a contention free (CF)-end control frame.

* * * * *